United States Patent [19]

Leenhouts

[11] 4,075,544
[45] Feb. 21, 1978

[54] LINEAR VELOCITY CHANGE STEPPING MOTOR CIRCUIT

[75] Inventor: Albert C. Leenhouts, Harwinton, Conn.

[73] Assignee: The Superior Electric Company, Bristol, Conn.

[21] Appl. No.: 736,019

[22] Filed: Oct. 27, 1976

[51] Int. Cl.² .......................................... G05B 79/40
[52] U.S. Cl. .................................... 318/696; 328/34; 307/271
[58] Field of Search ............... 318/696, 685, 138, 254, 318/415; 328/34, 41, 44, 74; 307/271, 225; 235/151.11

[56] References Cited

U.S. PATENT DOCUMENTS

| 3,806,821 | 4/1974 | Neimeyer et al. | 318/685 |
| 3,886,459 | 5/1975 | Hufford et al. | 328/34 |
| 4,016,472 | 4/1977 | Leenhouts | 318/696 |

Primary Examiner—Herman Hohauser
Attorney, Agent, or Firm—Ernest M. Junkins

[57] ABSTRACT

Linear velocity changes between steps are obtained by a digital circuit in a stepping motor system that receives commands of the number of steps to be produced in successive time intervals by providing a string of pulses during each interval and selecting certain of said pulses to provide motor steps with the selection being initially determined by the number of commanded steps in the interval and further being determined by whether the number of commanded steps for the interval has the same number of steps, a greater number or a lesser number than in the immediately preceding interval.

22 Claims, 6 Drawing Figures

PULSE DISTRIBUTION PER INTERVAL

PULSES SELECTED PER INTERVAL
NO CHANGE INTERVAL

| STEPS | | | | | | | | | | | | | | |
|---|---|---|---|---|---|---|---|---|---|---|---|---|---|---|
| 0 | | | | | | | | | | | | | | |
| 1 | 16 | 48 | | | | | | | | | | | | |
| 2 | 8 | 24 | 40 | 56 | | | | | | | | | | |
| 3 | 5 | 16 | 27 | 37 | 48 | 59 | | | | | | | | |
| 4 | 4 | 12 | 20 | 28 | 36 | 44 | 52 | 60 | | | | | | |
| 5 | 3 | 10 | 16 | 22 | 29 | 35 | 42 | 48 | 54 | 61 | | | | |
| 6 | 3 | 8 | 13 | 19 | 24 | 29 | 35 | 40 | 45 | 51 | 56 | 61 | | |
| 7 | 2 | 7 | 11 | 16 | 21 | 25 | 30 | 34 | 39 | 43 | 48 | 53 | 57 | 62 |

ACCELERATING INTERVAL

| | | | | | | | | | | | | | | |
|---|---|---|---|---|---|---|---|---|---|---|---|---|---|---|
| 0→1 | 45 | | | | | | | | | | | | | |
| 1→2 | 14 | 37 | 56 | | | | | | | | | | | |
| 2→3 | 8 | 22 | 35 | 47 | 59 | | | | | | | | | |
| 3→4 | 5 | 15 | 25 | 34 | 43 | 52 | 60 | | | | | | | |
| 4→5 | 4 | 12 | 19 | 27 | 34 | 41 | 48 | 54 | 61 | | | | | |
| 5→6 | 3 | 9 | 16 | 22 | 28 | 33 | 39 | 45 | 50 | 56 | 61 | | | |
| 6→7 | 3 | 8 | 13 | 18 | 23 | 28 | 33 | 38 | 43 | 48 | 52 | 57 | 62 | |

DECELERATING INTERVAL

| | | | | | | | | | | | | | |
|---|---|---|---|---|---|---|---|---|---|---|---|---|---|
| 1→0 | 19 | | | | | | | | | | | | |
| 2→1 | 8 | 27 | 50 | | | | | | | | | | |
| 3→2 | 5 | 17 | 29 | 42 | 56 | | | | | | | | |
| 4→3 | 4 | 12 | 21 | 30 | 39 | 49 | 59 | | | | | | |
| 5→4 | 3 | 10 | 16 | 23 | 30 | 37 | 45 | 52 | 60 | | | | |
| 6→5 | 3 | 8 | 14 | 19 | 25 | 31 | 36 | 42 | 48 | 55 | 61 | | |
| 7→6 | 2 | 7 | 12 | 16 | 21 | 26 | 31 | 36 | 41 | 46 | 51 | 56 | 61 |

LINEAR VELOCITY CHANGE STEPPING MOTOR CIRCUIT

In my U.S. copending application Ser. No. 524,965 now, U.S. Pat. No. 4,000,451, granted Dec. 28, 1976, filed Nov. 18, 1974 and entitled "Motion Control System and Method For Length Coded Sequential Commands", there is disclosed a motion control system which subdivides a movement into consecutive time intervals and produces the number of steps commanded in each time interval. A command is provided for each time interval and consists of a direction to provide either the same number of steps as in the prior time interval, a higher number of steps or a lesser number of steps. The system provides a plurality of different stepping rates with the rates being correlated to the time interval so that a whole number of steps are produced for each time interval with the steps being evenly spaced over the time interval. Moreover, the rates are further preferably selected so that as betweeen adjacent rates, there is only a one step difference in the number of steps in each time interval, hence the number of steps in each time interval is the same as in the immediately prior time interval, one more or one less. The steps so commanded ae produced at an essentially constant rate over the time interval by a digital motor control such as a stepping motor which is energized to produce a step essentially simultaneously with each pulse that it receives.

While such a system has been found to be extremely satisfactory, it has been found that under some conditions, such as light or no loads at moderate velocity stepping rates, a stepping motor may become unstable when an abrupt change in pulse rates of even only one step per interval occurs. Thus, though the change in rate is selected to be within the motor's ability to change its velocity to the new rate, there may occur operating conditions when the motor may not produce a step for each pulse but in which it may become unstable and flutter or oscillate to therefore perform unsatisfactorily.

One circuit for increasing the assurance of stabilized motor operation is disclosed in my copending application Ser. No. 619,360, filed Oct. 3, 1975 and entitled "Pulse to Step Motor Stabilizing Circuit". This circuit produces a varying rate of the pulses within a time interval by the use of a variable rate oscillator. However, though the system is satisfactory, it is analog in nature which introduces a time delay that is both variable within a small range and not consistently related to the motor velocity.

It is accordingly an object of the present invention to provide a motion control system that has an essentially linear velocity change which is produced digitally.

Aother object of the present invention is to achieve the above object with a motion control system in which the amount of lag or difference between the commanded movement and the actual movement is directly proportional to the velocity whereby a plurality of such systems may be used simultaneously with the relative proportions of their commanded velocities being maintained.

A further object of the present invention is to provide for linear velocity change in a pulse to step motion producing system that achieves the above objects with the system being quite economical to manufacture and simple in construction and readily usable with heretofore known motion producing systems of the type that has commands of only the incremental difference in distance of rates for consecutive equal duration time intervals.

In carrying out the preferred form of the invention, the motion control system disclosed in my first-mentioned patent application is somewhat modified to incorporate the present invention. The present system, however, still includes as in the prior system, a counter that controls by its count the number of pulses to be supplied for each time interval, an oscillator for providing pulses and a stepping motor or other pulse to step motion producing device for producing a step for each motor pulse it receives. Further, the system accepts a command at the beginning of each interval with each command being to increase or decrease the counter count by one or have it remain the same with the two former commands altering the count to produce a different number of steps per interval than in the immediately prior interval.

The heretofore known system provided seven different pulse trains from the oscillator pulses, one for each count of the counter plus the direction of movement. In the present system, not one but three different pulse trains for each count of the counter are provided and the system selects one of these three pulse trains for an interval. One of the trains for each counter count is equivalent to that of my prior system and provides the number of steps commanded with the steps being evenly spaced over the time interval. Another train, however, is selected only when an interval has its count increased by one from the prior interval and the steps in this accelerating train essentially linearly increase in rate over the interval while the third train is selected only when an interval has its count decreased by one from the prior interval and the steps in this decelerating train essentially linearly decrease in rate over the interval.

The second train is an accelerating train while the third train is a decelerating train with the steps of both being unequally distributed over the interval with the distribution producing the linear velocity change over the interval so that the motor is not required to abruptly change its velocity.

The rate at which the last step is supplied in a velocity change interval to the motor is at the rate that basically produces the velocity commanded by the counter count while its beginning step is basically at the rate of the end of the prior interval. The difference in the number of steps produced for each velocity change interval from that commanded is thus one-half of a step. For each accelerating interval, this difference is subtracted from the commanded movement so that the actual motor movement lags the commanded movement by one-half step while in a decelerating interval, the half-step difference is added to the commanded movement for the interval so that the motor, in effect, leads or produces a one-half step more movement than that commanded. As the half-step difference only occurs for each velocity change interval and as there are as many accelerating intervals as decelerating intervals in any complete movement, there is thus no loss of motion produced by the motor as compared to the motion commanded. However, even as importantly, during a movement, the difference that exists at the end of each interval between the commanded and the actual movements is exactly proportional to the velocity at which a motor is being commanded to move. Thus when two motion systems are utilized to provide simultaneous movement on two axes, the proportion of any instantaneous difference in movement on the two axes is the same as the proportion of their velocities or movement. Accordingly, when commanded to follow a path, the linear velocity change system of the present invention does not introduce an unacceptable error between the commanded path and the actual motor produced path.

Other features and advantages will hereinafter appear.

Referring to the drawing.

Figure 1:
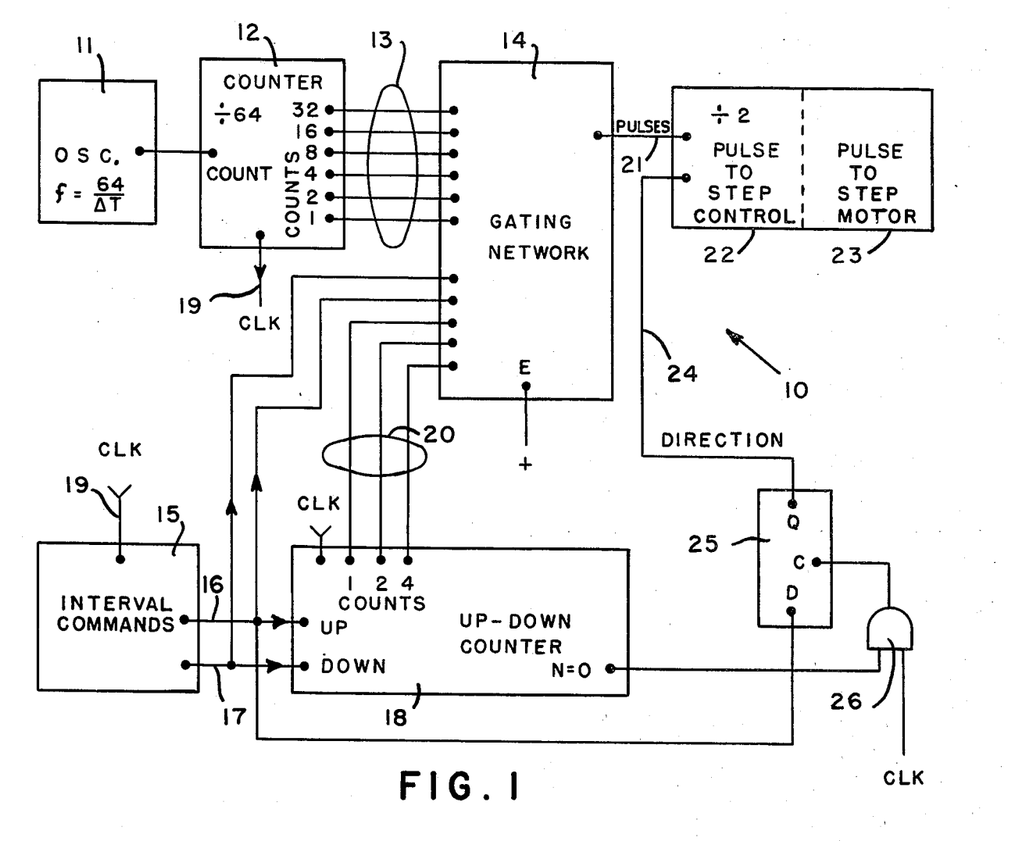
FIG. 1 is a block diagram of the digital linear velocity change motion system of the present invention for one axis.

Referring to the drawing, the embodiment in the motion system of the present invention shown in FIG. 1 is generally indicated by the reference numeral 10 and includes an oscillator 11 for supplying pulses to a repeating counter 12 that has a count range of 0-63. The count of the counter appears on six binary leads 13 (labeled 1,2,4,8,16 and 32) and each of the binary leads constitutes an input to a gating network 14. Other inputs to the gating interval are from an output of an interval command block 15 which supplies, at the beginning and for the duration of each time interval, a command, as a voltage level on a lead 16, if it is desired to increase the motor's velocity for that interval or by a voltage level on a lead 17 if it is desired to decrease the motor's velocity. If there is no change, the leads have the same voltage level. The leads 16 and 17 are also connected to up and down input terminals, respectively, of a counter 18 with a voltage level on the lead 16 causing the counter count to increment by one count while a voltage level on the lead 17 causes the counter count to decrease by one from its previous count at the beginning of an interval.

The counter 12 provides a clock pulse on a clock lead 19 whenever it has a 0 count with this clock pulse being supplied simultaneously to both the interval command block 15 and the counter 18. Whenever a clock pulse appears, which occurs only at the beginning of an interval, interval command block 15 supplies the command for the interval and the counter 18 immediately acts thereon to either change its count up or down by 1 while if the command is for a no velocity change, to have its count remain the same.

The counter 18 is a four bit up-down binary counter with a binary representation of 1, 2 and 4 appearing on a three conductor lead 20 that is connected as an input to the gating network 14.

The gating network provides on a lead 21 the number of evenly spaced pulses per time interval that is commanded by the count of the counter 18 for that time interval. A counter 18 count of zero produces no pulses and hence no movement of the motor while counts from one through seven produce one through seven steps, respectively, per time interval. There are thus seven different pulse trains obtained from the oscillator pulses and the one pulse train corresponding to the counter count is supplied as motor pulses to a pulse to step motor control 22 by way of the lead 21. The motor control, for each pulse received, causes a stepping motor 23 to have its energization changed so as to produce a step.

The motor 23 is reversible and a lead 24 is supplied to the motor control 22 so that a voltage level thereon will enable forward motion while the absence of a voltage level will enable reverse movement. The lead 24 is connected to the Q terminal of a D-type flip-flop 25 that has its D terminal connected to the "up" command lead 16. The C or copy terminal is connected to the output of an AND gate 26 which has one input connected to an N=O terminal in the counter 18 and its other input connected to receive a clock pulse. The direction can only change when the counter has a zero count and will assume the direction dictated by the next command. It will retain such direction until the counter again has a zero count when it will again assume the direction indicated by the next command.

It has been found, for reasons which will hereinafter appear, that rather than providing only one pulse on the lead 21 for each step of the motor, it is preferable to provide two pulses. Thus, for an interval wherein the counter 18 has a count of seven the gating network 14 will normally provide fourteen evenly spaced one-half step pulses. The pulse to step control 22 accommodates the two pulses per step by either dividing the number of pulses by two to change the energization of the motor windings for only every other pulse or it may act on each motor pulse to produce a half-step energization and a half-step of the motor 23. One form of a pulse to step control that may be utilized is disclosed in U.S. Pat. No. 3,746,958, granted July 17, 1973 to me and assigned to the assignee of the present invention.

During a time interval, the counter 12 will binarily represent on its six leads 13, each one of the decimal counts of 0 to 63 with the rate of change from one count to the next being constant in view of the oscillator 11 providing pulses at a constant rate. As another input to the gating network 14 are the three leads 20 from the counts terminals of the up-down counter 18, the gating network may conveniently take the form of a programmable memory. The memory accepts sixty-four different binary combinations in leads 13 while the leads 20 produce eight possible binary combinations so that there is thus 512 (64×8) different possible binary representations at the input. For each representation, the network 14, as a programmable memory, is programmed to produce or not produce a binary 1 voltage on the lead 21 from the memory output with this voltage resulting in an output pulse to the control 22.

Figure 4:
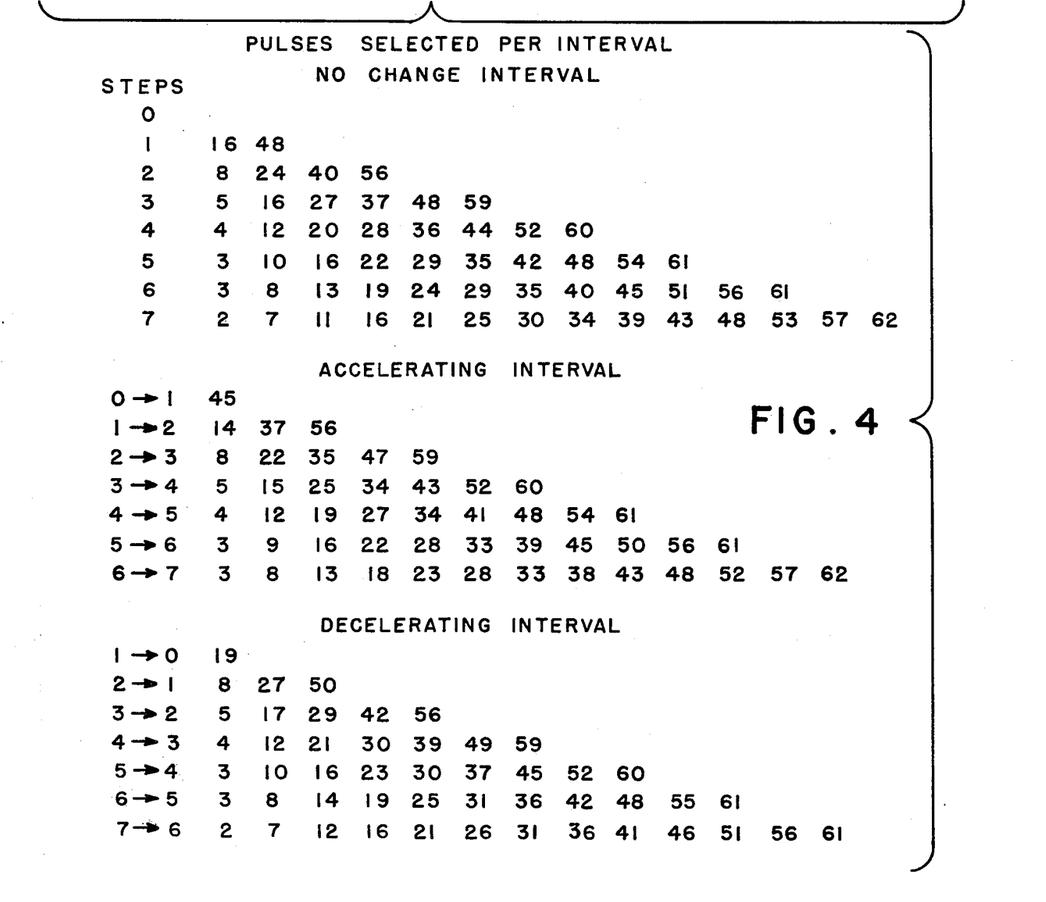
FIG. 4 is a chart of the pulses selected from the oscillator trains for each of three different pulse trains for each of seven different rates.

When an interval is to have the same number of steps as in the prior interval, the motor is to produce the number of steps commanded by the counter 18 count and thus network 14 is programmed in accordance with the chart shown in FIG. 4, entitled "no change interval". As indicated therein, if the number of steps desired is zero, (an interval dictated when the up-down counter 18 has a count of zero), then the network 14 will not produce any pulses on the lead 21 by being programmed to so produce no output pulses for all memory inputs when all the terminals 1, 2 and 4 of the counter 18 are at a binary 0. When one step (or two half step output pulses) is to be produced, the counter 18 has a count of 1, the leads 20 have the binary representation 100, respectively, and the network 14 is programmed to produce a pulse for a binary representation on the leads 13 which corresponds to decimal counts of 16 and 48 of the counter 12. These numbers are shown horizontally aligned with the 1 step command in the chart of FIG. 4. For two steps per interval when the leads 20 have binary representation 010 for a count of two, then the binary representations of decimal counts 8,24,40 and 56 are selected to produce a pulse when they occur on the leads 13. Accordingly, for the remaining different number of steps per interval, the indicated decimal counts of the counter 12 will each cause an output pulse to appear on the lead 21. Any decimal count representation from the counter 12 that is not listed in an interval command does not produce an output pulse.

It will be noted that with 0 to 63 pulses in an interval, that the decimal numbers selected, according to the chart under the "no change interval" to produce an output pulse, provides evenly spaced pulses over the time interval, as in my copending application.

In accordance with the present invention, the network 14 has its number of inputs increased by two with the further inputs being derived from the up and down leads 16 and 17 from the output of the interval commands 15. The addition of just one more input to the network 14 doubles the number of possible different binary input representations to the network while a further input doubles that number so that the network 14 now is capable of receiving two thousand forty-eight different binary representations. Again for each one of these different binary representations, the network 14 may be programmed to produce a half step pulse on the output lead 21.

Further shown in the chart of FIG. 4, is a heading "accelerating interval" where the steps to be supplied per interval are shown on the left with each count of the counter 12 selected to supply a pulse being shown horizontally opposite thereto. An accelerating interval occurs whenever the command of a present interval is required to have one more step than in the prior interval so that the lead 16 is a binary 1 during the interval. Again, only the decimal counts indicated for counter 12 provide one-half step pulses. The binary 1 on lead 16 together with the count of the counter 18 caused by the command to increase the count by 1 are supplied as inputs to the network 14. Thus, when a prior interval has zero steps and the command is to produce one step in the present interval, the network 14 is programmed so that only one pulse will appear and it will be the pulse that occurs when the counter 12 has a count of 45. If the prior interval had one step and the present interval is to have two steps, then pulses will appear on the lead 21 for counts of 14, 37 and 56 of the counter 12. In the chart the commanded number of steps in the present interval are shown by the numeral at the tip of the arrow while the number of steps commanded in the immediately prior interval are shown at the tail of the arrow.

For a deceleration interval, when the number of command steps is to decrease by one from the prior interval, then the lead 17 has a binary 1 which is applied as an input to the network 14. For such an interval, the decimal counts of the counter 12 for which pulses are selected are shown horizontally opposite thereto. Again the numeral at the arrow head is the command which the counter 18 count requires for the number of steps to be produced for the present interval while the numeral at the arrow tail, is the number of steps commanded for the immediately prior interval.

It will be noted that the network 14 may be programmed so that when both leads 16 and 17 have the same binary value, i.e., either 0 or 1, that the no change interval pulse distribution will be used to obtain the pulse train. Also the counter 18 will not change its count for identical binary representations on these leads. It should also be noted that the direction of movement does not change the pulses selected as the number of steps commanded is not related to the direction, only the extent.

Figure 2:
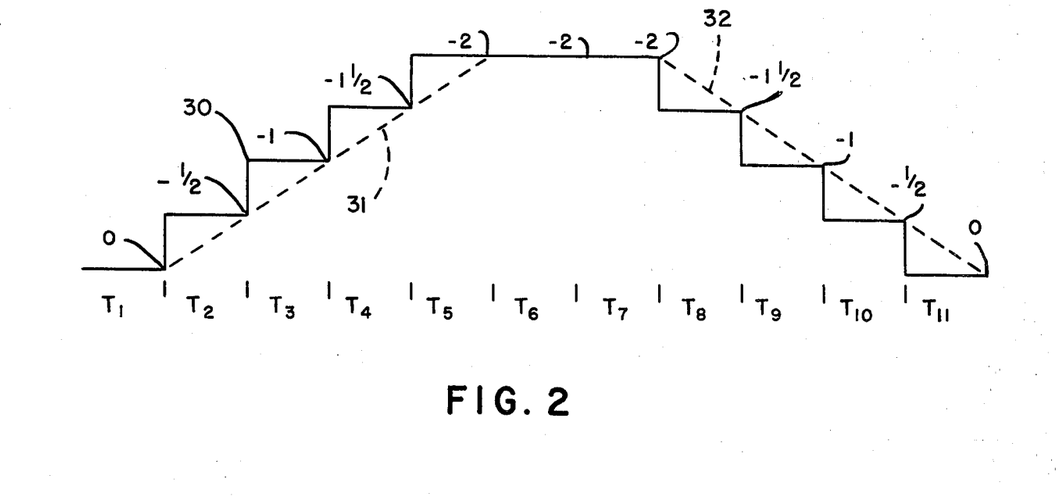
FIG. 2 is a plot of velocities that occur for consecutive time intervals in a typical movement.

Referring to FIG. 2, there is shown a plot of a movement having successive time intervals T1 through T11 on the abscissa with the command per interval in steps from 0 to 4 being on the ordinate. The solid line, extending in step-wise fashion and indicated by the reference numeral 30, represents the commands for motor movement or velocity received from the interval command block 15. It will be seen that for each of the intervals T2, T3, T4 and T5 that the system is commanded to move at increasing velocities with each interval being increased in velocity or distance by one step. For the intervals T6 and T7, there is no change in the velocity while for the intervals T8 through T11 the velocities are required to decrease one step for each interval.

When the pulses in the lead 21 are selected in accordance with the accelerating interval chart for the intervals T2 through T5, there is an essentially linear velocity change in the pulses in an interval as shown by the dotted line 31. The indicated velocity of the motor, is actually the pulse rate as an assumption is made that there is essentially simultaneous conversion of a pulse to one-half a step or two pulses for one step. The velocity commanded increases from essentially the velocity at the end of the previous interval to essentially the velocity commanded at the present interval but does not exceed the present commanded velocity by the changing pulse rate during the interval.

For the "no change intervals" T6 and T7, utilizing the pulse selection under the "no change intervals" heading in FIG. 4, the velocity remains the same so that the motor is supplied sufficient pulses to move the number of steps commanded by the counter 18 count. For the decelerating intervals, T8 through T11, the rate of the pulses to the motor decreases linearly, as shown by the dotted line 32, with the pulse rate at the beginning of the decelerating interval closely approximating the rate at the end of the prior interval while the end of a present interval has essentially the velocity commanded by the input command for the present interval.

When there is a velocity change in an interval, the linearly accelerating pulse rate causes the motor to be directed to move one-half a step less than the number of steps commanded for the accelerating interval. Thus a lag of one-half step occurs between actual motor movement and commanded motor movement at the end of each accelerating interval. The one-half step lags are accumulative so that at the end of T2, the lag is one-half step; at T3, 1 step; at T4, 1½ steps and at T5, 2 steps. However, during the intervals T6 and T7, in which the commanded velocity remains constant, the actual motor movement is the same as the commanded movement but the lag does not change from its value of 2 steps.

For decelerating intervals, the actual motor movement results in one-half a step more than the commanded movement and thus the lag is reduced one-half step for each decelerating interval. Accordingly, at the end of T8, the lag is 1½ steps; at T9, 1 step; at T10, ½ step and is completely eliminated at the end of T11 when the movement is completed. It should be noted that the lag in steps at any interval is thus equal to the difference between the number of accelerating and decelerating intervals, that such a difference sets the velocity of the motor, and thus the amount of lag is directly proportional to the velocity. The values of the lag in steps are shown on the plot.

Figure 3:
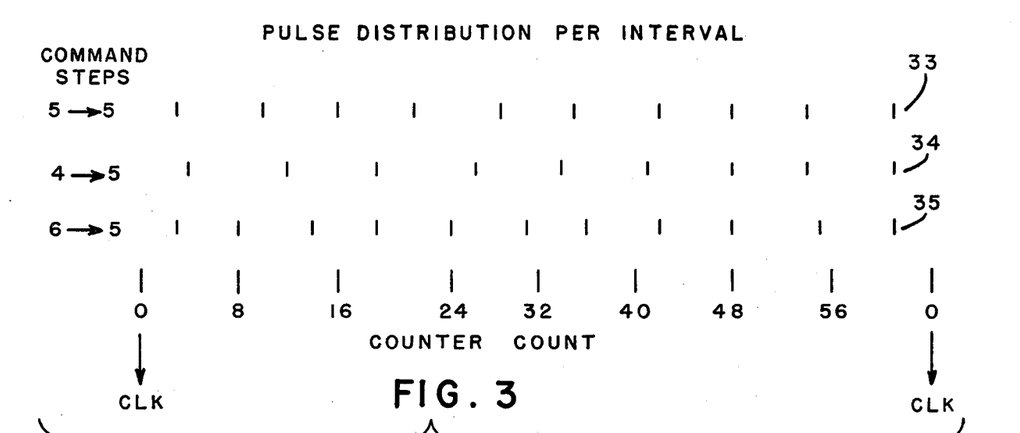
FIG. 3 is a plot showing the distribution of steps over three different time interval commands for the same counter count.

Shown in FIG. 3 is a plot of the pulse distributions for three different five step interval commands. Distribution plot 33 is for a no change interval of five steps while plot 34 is for an interval accelerating to five steps and plot 35 for an interval decelerating to 5 steps. Each of the distribution plots is plotted against the count of the counter 12. The position of each pulse is obtained by plotting the numbers shown on the chart in FIG. 4. It will be seen that with the plot 33 of a no change interval, the pulses are evenly distributed over the interval and that there are ten half steps or five steps in the interval. For the plot 34 which is an accelerating interval, the pulse distribution shows that the time between the pulses decreases as the interval progresses and that there is one less half step pulse than in the commanded number of pulses, while for the decelerating plot 35, the pulse distribution shows that the time between pulses is lengthening as the interval progresses and that there is one more half step pulse, namely eleven, than that commanded for five steps.

The determining of which counts of the counter 12 to use to produce a pulse is made by calculating the time in each interval when a pulse should appear to effect a linear velocity change. Knowing the time of each pulse, the one count of the 64 count cycle of the counter 12 which appears in an interval nearest to that time is then selected. To find the time for each half step pulse, the distance directed in steps for each interval is subdivided into equally distributed half steps and from which the value of time and hence, the counter count, may be obtained. For a no change interval of one step, two one-half step pulses should occur at the ¼ and ¾ step positions in the interval. For a two step no change interval, 4 one-half step pulses should occur at the ⅛, ⅜, ⅝ and ⅞ one-half step positions and for the five step interval 10 one-half step pulses are to occur at the 1/20, 3/20, 5/20, 7/20, 9/20, 11/20, 13/20, 15/20, 17/20 and 19/20 step positions.

For each position the one count of the 64 counter 12 which occurs simultaneously or essentially simultaneously when a pulse should occur, is selected. For the ¼ step position, the 16 count is selected while the 48 count is selected for the ¾ position since both are fractional parts of 64 equal to a value of such positions. For the 1, 3, 5 and ⅞ths position of the two step interval, counts of 8, 24, 40 and 56 are selected as shown in FIG. 4. For the five step, no change interval counts of 3,10, 16, 22, 29, 35, 42, 48, 54 and 61 are selected. It will be noted that 3/64ths is closer to 1/20th than 2/64ths or 4/64ths and hence while 3/64ths is not exactly equal to the fraction 1/20, it is the closest count of the counter thereto. Naturally, if desired, a counter having a higher count may be used if a finer resolution is desired.

In velocity change intervals, the steps are also equally positioned in the interval in the sense that they are of equal distance over each time interval but they are not equally spaced apart in time. Additionally, the number of half step pulses is either reduced by one or increased by one with respect to the commanded number of steps in the interval. It has been found convenient in determining the location of each of the steps in accelerating intervals to consider a series of consecutive accelerating intervals, such as T2, T3, T4 to the maximum commandable rate and determine the locations of each of the steps from the start of the movement. Thus, in the first interval only one one-half step pulse should appear and it appears at the middle of the interval so S in a total movement in steps from the start to this position is one-fourth. For the next interval, a one going to two step interval, three half-step pulses occur at a distance from the start of the movement of S=¾, 1¼ and 1¾ steps. For the next interval of two going to three steps, five one-half step pulses occur at distances from the start of the movement of 2¼, 2¾, 3¼, 3¾ and 4¼ steps while for a three going to four step interval, seven pulses occur at 4¾ through 7¾ steps in half step increments. For each subsequent accelerating interval the number of steps is determined and for each one thereof, one-half is added to the value of S in order to obtain the distance of that pulse in steps from the start of the movement.

Using the formula $S=\frac{1}{2}AT^2$, or T equals 1 over the square root of A times the square root of 2S, the time for each of the half-step pulses to appear from the start of the movement is calculated. In this formula, as 1 over the square root of A is equal to 1 for each interval by selection of the duration of the interval that is in turn set by the frequency of the oscillator 11, the computation of the time for each half-step produces a whole number which indicates the number of prior intervals in which the half-step appears from the start together with a decimal portion which selects the position of the pulse in the interval. With the formula T equals the square root of 2S for the first pulse, T thus equals the square root of 2 times ¼ or 0.707. The 0 whole number places the step in the first interval while the count of the 64 count counter 12 which is fractionally essentially equal to the decimal 0.707 is 45. This number is thus selected and shown in FIG. 4 opposite the 0→1 command in the accelerating interval table. For the next three pulses, T equals the square root of 2 times ¾ or 1.225; the square root of 2 times 1¼ or 1.581 and the square root of 2 times 1¾ or 1.871. The counter counts corresponding essentially to decimal fractions of these numbers are 14, 37 and 56, respectively. The whole number value of T indicates that the pulses selected are the whole number plus one interval and hence are in the second accelerating interval. For the next five one-half step pulses, T equals 2.121, 2.345, 2.550, 2.739 and 2.915, respectively which essentially correspond to counts of 8, 22, 35, 47 and 59 in the third interval.

In the herein disclosed embodiment, the rate of velocity change is the same as for both accelerating and decelerating intervals. Hence, while the pulse distribution in the decelerating intervals may be calculated as above, it is convenient to obtain them by first reversing the order of the half step pulses in an accelerating interval having the same number of pulses and then subtracting the count of each from 64 to obtain the decelerating interval pulse counts. Accordingly, for the decelerating interval of 1 going to 0 steps having one pulse, the count 45 of the corresponding accelerating interval 0 going to 1 is subtracted from 64 with the result being the count 19 of the counter 12. For the next larger decelerating interval of 2 going to 1 with 3 pulses, the 1 going to 2 accelerating interval pulses, are inverted and subtracted so that counts of 8 (64−56); and 50 (64−14) are the counts of the counter needed to produce linear deceleration for this interval. The other counts in the different remaining decelerating pulse trains may accordingly be determined in a similar manner from the values of accelerating pulse trains having the same number of steps. If desired, and if deceleration is at a different rate than acceleration, the value of S for each half step may be computed, the value of T computed therefrom and the selection of the essentially equal counter count may then be made.

Figure 5:
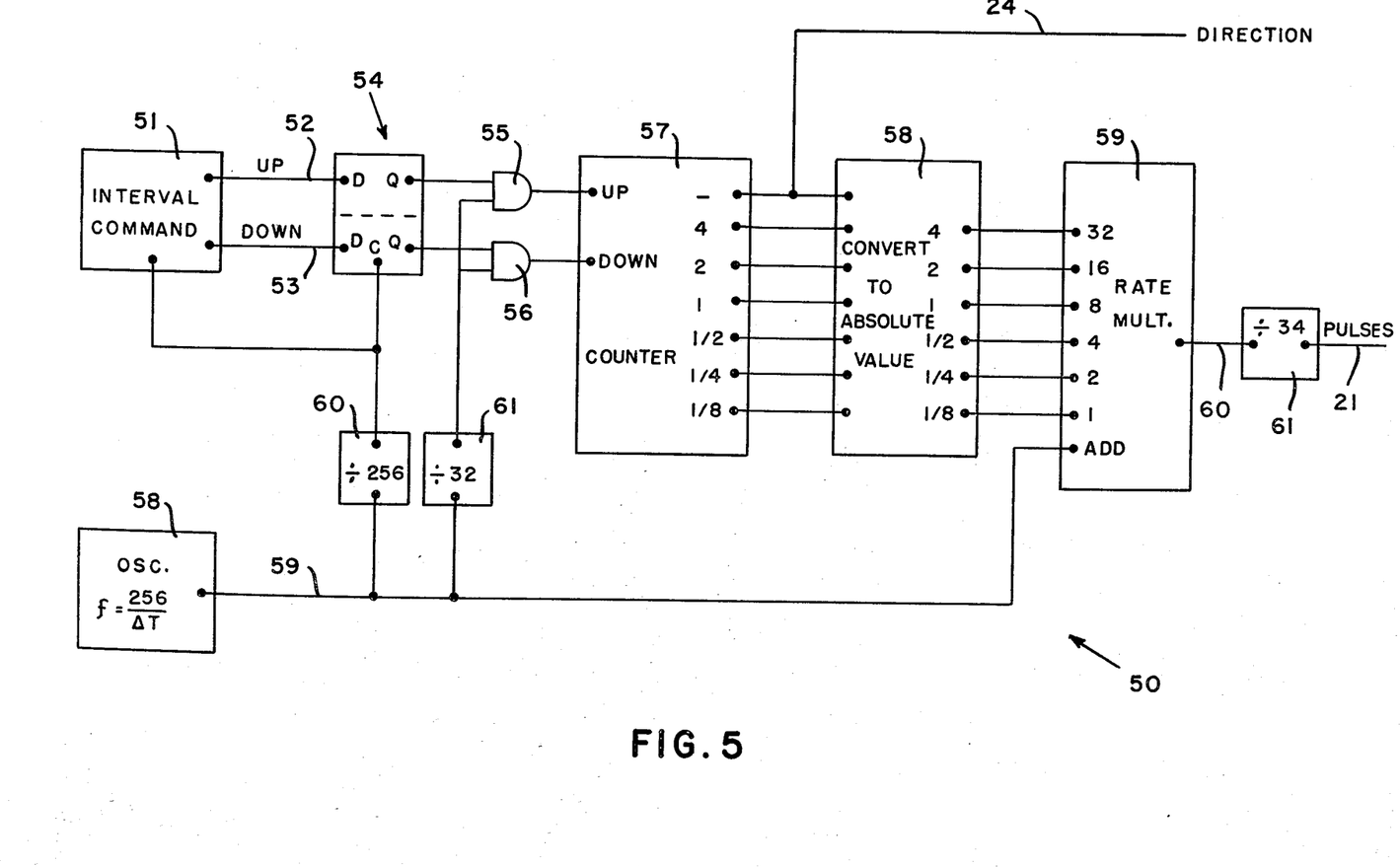
FIG. 5 is an essentially block diagram of another embodiment of a linear velocity change system for one axis.
Figure 6:
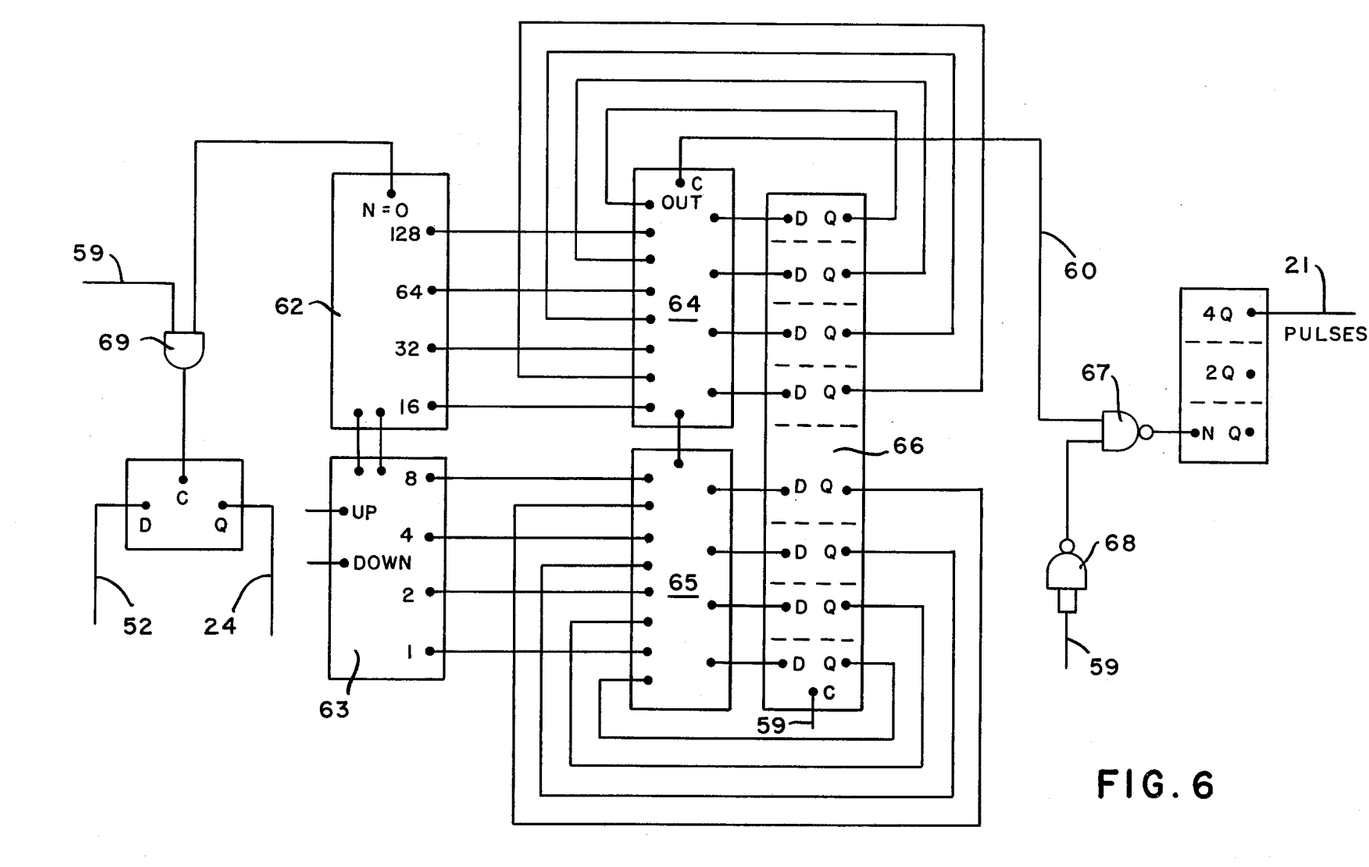
FIG. 6 is one form of a logic circuit for the embodiment shown in FIG. 5.

Shown in FIGS. 5 and 6 and generally referred to by the reference numeral 50 is another embodiment of the present invention, which provides a finer resolution of velocity change than that disclosed in the previous embodiment as it utilizes, in effect, a 256 count counter. An interval command block 51 supplies up and down commands on leads 52 and 53 to the D terminals of a pair of D type flip-flops 54. The Q terminals thereof are connected to the inputs of a pair of AND gates 55 and 56 which in turn have their outputs connected to up and down terminals of a seven bit up-down binary counter 57.

An oscillator 58 supplies pulses at a frequency of 256 divided by the duration in seconds of an interval on a lead 59. The output of a divide by 256 counter 60 supplies a clock pulse at the beginning of each interval to the interval command block 51 and the copy terminals of the flip-flops 54 so that the next command is immediately assumed by the Q terminals. As the other inputs to the gates 55 and 56 are from the output of a divide by 32 counter 61, the information of the command is thus supplied at the beginning of the interval to the counter 57.

The counter 57 basically functions as the counter 18 with the exception that each count is capable of being subdivided into eight increments. Thus eight times during an interval it will have its count changed by reason of the ÷ 32 counter 61 with the net effect being that its count will change one whole number of steps during the interval in the direction commanded by the input commands.

The output of the counter 57 is directed to a converter 58 which converts the count into positive values and supplies same to a rate multiplier 59. The multiplier adds the converter 58 count to its prior count for each pulse from the oscillator and provides an overflow pulse on a lead 60 each time it reaches a value of 256. A divide by 4 counter 61 then reduces the multiplier pulses into half step pulses for the motor which are received by the motor control 22 on the lead 21.

If desired, full step pulses may be obtained by using a divide by 8 counter in place of the counter 61.

It should be noted that the ÷ 32 counter 61 supplies its pulse at the midpoint of its count to assure that the up-down counter 57 also changes its count at this time. Thus, for the first half of the one eighth interval the counter 57 has a whole number count that is the same as the number of steps commanded for the prior interval and that the last half of the last one eighth of an interval, has the whole number count that is commanded for the present interval.

Shown in FIG. 6 is a detailed logic diagram of the components forming the different blocks in FIG. 5. The up-down counter 57 and converter 58 may take the form of two four bit up-down counters 62 and 63 connected in cascade, and have a type number of N74193. The rate multiplier 59 may be composed of two, cascade connected, four bit binary full adders 64 and 65, type N7483, and eight D type flip-flops 66. The ÷ 8 counter 61 may also be a four bit counter type N74193 which has its input connected to a carry over output from the adder 64 through a NAND gate 67 which is actuated with each oscillator plus through an inverter 68.

The counter 62 has an N=O terminal connected to an input of an AND gate 68 while another input is connected to the output 59 of the ÷ 256 converter to receive a clock pulse at the beginning of each interval. The output of the gate 68 is connected to the C or copy terminal of a D type flip-flop 69 whose D terminal is connected to the up command lead 52. The Q terminal supplies direction on the lead 24 to the motor control 22.

The embodiment shown in FIGS. 5 and 6 has been found to more easily provide a finer resolution rather than increasing the size of the memory in the gating network 14 in the first described embodiment. The resolution of the FIG. 5 embodiment may be easily doubled, for example, by doubling the frequency of the oscillator 58 to 512 pulses per interval and adding one more binary stage to the ÷ 4 counter 61. Further, the embodiment of FIG. 5 is more easily changed to accommodate a greater number of steps per interval than that heretofore described.

Each of the embodiments described relates to only controlling the movement of one motor and hence one axis. Each additional axis will require essentially identical structure, though, however, some components, such as the oscillator are preferably made common to every axis.

It should be noted that both embodiments of the present system depend upon the pulses from the oscillator 11 being at a constant rate for an interval. This rate, however, can be changed between intervals or be set at any particular value without altering the linear velocity change in an interval, though the rate of change by being dependent on the oscillator pulse rate, will change.

It will accordingly be understood that there has been disclosed a digital motor control system that receives commands of different rates of motor velocity for consecutive time intervals but yet causes the motor velocity to change linearly within a time interval. For each commanded rate, one of three possible pulse trains is selected depending on the velocity commanded for the interval. If the velocity remains the same as in the prior interval, a first pulse train of constant rate pulses is selected, for an increased velocity interval a second pulse train having linearly increasing rate pulses is selected while a reduced velocity interval selects the third pulse train having linearly decreasing rate pulses. In each of both of the latter two trains, the number of pulses in the pulse train directs a movement of the motor means that is a constant value of difference from the motion commanded but as the difference is subtracted for acceleration and added for deceleration, a loss of movement does not occur. However, by the lag or difference being directly proportional to the velocity at the end of each interval, when two systems of the present invention are utilized to provide simultaneous movement on two axes, insignificant path error is introduced between the commanded movement and actual movement.

Variations and modifications may be made within the scope of the claims and portions of the improvement may be used without others.

I claim:

1. A motion control system for producing digital motion in accordance with input commands of stepping rates for consecutive time intervals comprising means for accepting the input commands including a command for a different stepping rate for a present time interval as compared to the command for the stepping rate of a prior time interval, means for providing a train of pulses corresponding to the present commanded stepping rate including means for linearly changing the rate of the pulses in the train from initially the rate of the prior commanded stepping rate to finally the rate of the present commanded stepping rate and pulse to step means for receiving the pulses and producing movement essentially in accordance with the rate of the pulses in the train.

2. The invention as defined in claim 1 in which the stepping rate sets the number of steps to be produced during an interval and in which the means for providing a train of pulses provides a train of pulses to the pulse to step means to produce a movement during the interval that has a number of steps that is one-half a step different than the commanded rate for the interval.

3. The invention as defined in claim 2 in which the means for providing decreases the number of pulses in a train for an interval having a higher stepping rate command than the command for a prior interval and in which the means for providing increases the number of pulses in a train for an interval having a lower stepping rate command than the command for a prior interval.

4. The invention as defined in claim 3 in which there are a plurality of interval commands with there being a greater number of commands for a higher stepping rate than for a lower stepping rate, and in which the means for providing has provided sufficient pulses in the pulse trains provided to produce a movement at the end of each interval that is one-half a step times the greater number of higher commands commanded by the input commands.

5. The invention as defined in claim 3 in which there are a plurality of input commands and in which at the end of each interval the means for providing has provided pulse trains to the pulse to step means to produce a movement that is one-half a step less than the movement commanded by the input command for the difference between the number of higher interval commands and number of lower interval commands.

6. A motion control system for producing digital motion in accordance with input commands of stepping rates for consecutive time intervals comprising means for accepting the input commands to produce a higher, lower or the same stepping rate for each time interval as compared to the stepping rate in the immediately prior time interval, means for providing three different pulse trains for each different possible command rate, means for selecting the first pulse train only for a command of the same stepping rate and for selecting a second pulse train only for a command of a higher stepping rate and for selecting the third pulse train only for a command of a lower stepping rate, digital motor means for providing step motion in response to pulses received and means for directing the selected pulse train to the motor means during the time interval.

7. A motion control system according to claim 6 in which the stepping rates are defined by the number of steps in an interval, in which the first pulse train of each stepping rate has a sufficient number of pulses to cause the motor means to provide the number of steps commanded, and in which the second and third pulse trains have a different number of pulses than the first pulse train for a corresponding commanded rate to cause the motor means to produce a different number of steps than that commanded for the interval.

8. A motion control system according to claim 7 in which the number of pulses in the second pulse train is sufficiently less than the number of pulses in its corresponding first pulse train to produce one-half a step less movement than the commanded number and in which the number of pulses in the third pulse train is sufficiently greater than the number of pulses in its corresponding first pulse train to produce one-half a step more movement than the commanded number.

9. A motion control system according to claim 8 in which the motor means produces a one step movement for each two pulses received and in which the second and third trains have one more and one less pulses in their respective trains than twice the number of commanded pulses in the corresponding first train.

10. A motion control system according to claim 7 in which the difference in the number of steps in the second train is the same for each second train for each of the stepping rates.

11. A motion control system according to claim 10 in which the difference in the number of steps in the third train is the same for each third train for each of the stepping rates.

12. A motion control system according to claim 11 in which the movement produced by each second train is one-half step less than the commanded number of steps in the interval and in which the movement produced by each third train is one-half step more than the commanded number of steps in an interval whereby the difference in movement between that commanded and that produced by the motor means at the end of each interval is the algebraic sum of the half step difference for the second and third trains.

13. A motion control system according to claim 6 in which the pulses in the first train have a constant rate throughout the train, in which the pulses in the second train have an increasing rate from pulse to pulse in the train and in which the pulses in the third train have a decreasing rate from pulse to pulse in the train.

14. A motion control system according to claim 13 in which there is an essentially linear change in the rate of change of the rates thereby providing an essentially linear velocity change of the motor means for the time interval.

15. A motion control system according to claim 6 in which the rate of the first pulse in each train essentially approximates the rate of the last pulse in the train for the prior interval and in which the last pulse of a train essentially approximates the commanded rate for the interval.

16. A motion control system according to claim 6 in which the means for providing the pulse trains includes an oscillator means for supplying an identical string of pulses at a constant rate for each time interval, said string having at least twice the number of pulses as there are steps commanded in an interval by the maximum stepping rate of the system.

17. A motion control system according to claim 16 in which the means for providing further includes a counter for receiving the string of pulses and producing a unique binary representation of each pulse in the string, means for producing a binary representation of the commanded stepping rate for the interval and producing the trains by being programmed to produce a pulse in the train for selected combinations of received representaions.

18. A motion control system according to claim 17 in which the selecting means provides binary command representations of the command to maintain the same rate, increase the rate or decrease the rate, in which the command representations are directed to be received by the memory and in which the memory is programmed to produce the first, second or third trains in accordance with the command representations.

19. The invention as defined in claim 6 in which the means for providing includes a rate multiplier for producing carryover pulses that form the trains and for adding a number to itself upon actuation and the means for selecting includes means for changing the number added during the providing of the second and third pulse trains.

20. The invention as defined in claim 19 in which the means for changing changes the number added a fixed number of times during each interval and in which the means for providing includes means for limiting the number of carryover pulses in each train to a fractional ratio of the fixed number of changes.

21. The invention as defined in claim 20 in which the fractional ratio is one half.

22. The invention as defined in claim 20 in which the fractional ratio is one.

* * * * *